Figure 1:
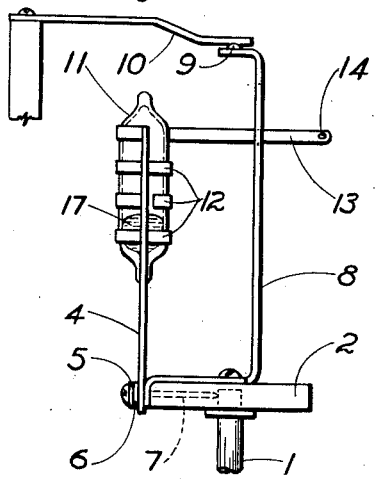

Oct. 31, 1939. W. R. WALKER 2,177,759

CENTRIFUGAL SWITCH

Filed March 9, 1938

INVENTOR
Warren R. Walker
BY Thos. F. Brown
ATTORNEY

Patented Oct. 31, 1939

2,177,759

UNITED STATES PATENT OFFICE 2,177,759

CENTRIFUGAL SWITCH

Warren R. Walker, Short Hills, N. J., assignor, by mesne assignments, to General Electric Company, a corporation of New York Application March 9, 1938, Serial No. 194,943

7 Claims. (Cl. 200—80)

The present invention relates to electric circuit makers and breakers of the fluid flow type, and in particular to devices of this type which are responsive to centrifugal forces.

A particular object of the invention is to provide a switch of the fluid flow type which will respond to centrifugal forces to open or close a circuit therethrough. A further object of the invention is to provide a switch of this type which will be responsive to slight changes in speed of rotation. Still another object of the invention is to provide a switch which will be insensitive to slights changes in speed of rotation once it has operated to open or close the circuit. Still other objects and advantages of the invention will appear from the following detailed specification, or from an inspection of the accompanying drawing.

The invention consists in the new and novel combination of elements hereinafter set forth and claimed.

I have discovered that a novel speed-responsive control of an electrical circuit is produced by mounting a fluid flow switch, of the well known tubular type, for example, on a rotating body in such a fashion that at a critical speed the centrifugal forces exerted on said switch produce an abrupt change in the slope of said switch, this change being coupled with a simultaneous shift in the center of mass thereof which is due, at least in part, to the flow of the fluid within said switch, this abrupt shift in the center of mass being in a direction to increase the centrifugal forces holding the switch and switch fluid in the new position, whereby a considerable decrease in speed from the aforesaid critical speed is required before a reverse flow of the switch fluid can occur. The speed at which this reverse flow occurs is also critical, and dependent upon the constants, which include the mass of the elements and the disposition thereof with respect to the axis of rotation, together with other factors involved in the mounting which will be discussed hereinafter.

According to one form of my invention the fluid flow switch is mounted on a member providing a resilient support between it and a rotatable member, with the center of mass of the switch and the yielding portion of its assembly somewhat displaced from the axis of rotation, and with the line of fluid flow within the switch at a large angle to the horizontal, up to and including 90° thereto. The change in angle of the switch with speed causes the tendency of the mercury to move outwardly with increased speed to increase much faster than would be the case with a switch of fixed angle, with the result that the sensitivity of the switch to changes in speed is greatly increased over any of the devices used heretofore, and its accuracy correspondingly increased. This increased sensitivity is attained, of course, regardless of the particular type of fluid flow switch employed, since with my novel resilient mounting the tilting movement of the switch accentuates the effect of the centrifugal force, regardless of the shape of the switch envelope. Thus in some cases a rotating type of switch is employed where this sensitivity, without the other features of my invention, is desired.

In another embodiment of the invention the resilient mounting is dispensed with, the switch being pivotally mounted on a support which is eccentric to the axis of rotation, with the weight of the switch fluid holding the lower end of the switch downward against a stop which prevents the line of flow of the fluid within the switch quite reaching the vertical. A second stop is provided which prevents this line of flow ever quite reaching the horizontal. Within these limits these stops may be widely varied to produce the result described hereinafter. With this mounting the gravitational forces are balanced against the centrifugal forces to control the speed at which the switch operates, the same abrupt change in switch position being obtained as with the resilient mounting. It is obvious, of course, that the positions of the two stops are highly critical in determining the speed at which each of these operations of the switch occur, and that by suitably positioning the stop controlling the return flow of the fluid the operation of the switch may be delayed, where desired, down until rotation has virtually stopped, while at the same time a high or low speed, as desired, may be required to cause the operation of the switch upon increase in speed. Many uses for a switch having these novel characteristics will, of course, occur to those skilled in the art, such as the opening or closing of a circuit only upon the actual stalling of a rotating device.

While in general the axis of rotation of the switch will be substantially vertical, it is to be understood that substantial variations therefrom may occur in some cases, particularly with the resilient mounting, without seriously interfering with the desired operation of the switch. In fact the resilient mounting has been found to particularly adapt itself to this type of operation, where necessary, and in defining the invention it is to be understood that "substantially vertical" is intended to cover these permissible variations.

Figure 2:
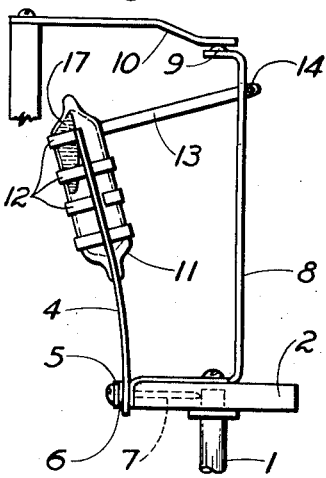
Figure 3:
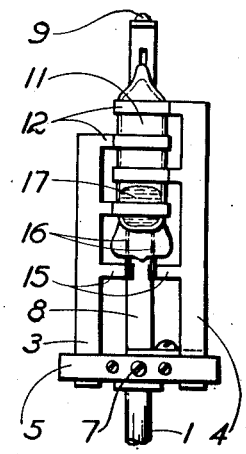
Figure 4:
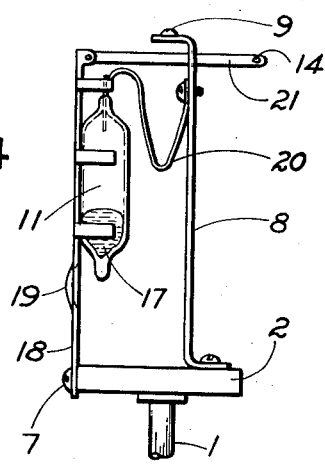
Figure 5:
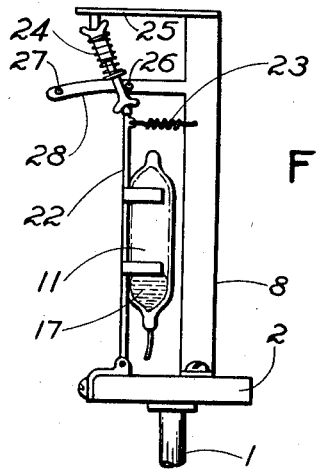
Figure 6:
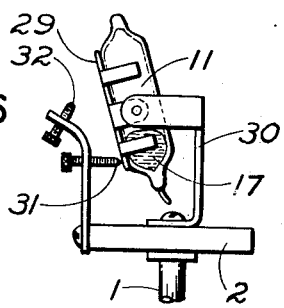
Figure 7:
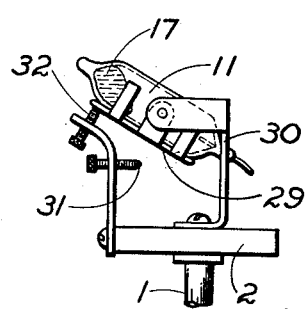

For the purpose of illustrating my invention I have shown several preferred embodiments thereof in the accompanying drawing, in which Fig. 1 is an elevational view of one form of my novel switch structure, at rest, Fig. 2 is a similar view of the same structure, showing the changed position of the elements upon rotation thereof, Fig. 3 is a side view of the same structure, at rest, Figs. 4 and 5 are elevational views of modifications of the structure of Fig. 1, adapted to produce a greater snap action of the switch when it operates, Fig. 6 is an elevational view of another embodiment of the invention, shown at rest, and Fig. 7 is a similar view of the same switch, showing the position it assumes when rotated.

In this drawing, with special reference to Figs. 1 to 3, there is shown a shaft 1 having mounted thereon a supporting base 2, which is conveniently made of any suitable insulating material. A pair of spring metal strips 3 and 4 which extend upwardly in spaced side by side relation from said base are held thereagainst by means of a metal clamping strip 5. Said strip 5 is insulated from the strip 4 by means of fiber spacer 6, while it is electrically connected with the strip 3 through a suitable metal shim (not shown) of the same thickness as the spacer 6. A stud 7 which passes through the clamping strip 5 serves to lock the base 2 on the shaft 1 for rotation therewith, and also electrically connects said strip 5 with said shaft. An upright metal member 8 which is mounted on the base 2 near the axis of rotation has its lower end electrically connected with the strip 4, while its upper end is bent over and has a boss 9 thereon which is located on the axis of rotation of the shaft 1. A contact spring 10 which is suitably supported makes continuous contact with this boss and thus serves as one of the leads to the rotating switch member, the grounded shaft 1 serving as the other lead. A mercury switch 11 of conventional tubular design is mounted between the free ends of the strips 3 and 4, each of said strips having a pair of lateral extensions 12 which encircle said switch in staggered relation whereby said switch is held in the desired position and at the same time serves as an insulating body which holds the free ends of the strips 2 and 3 in the desired relationship. An extension 13 from one of said loops 12 on the strip 4 extends through a slot in the upright 11 and has a stop pin 14 near the end thereof which limits the movement of the switch 11, and thus prevents permanent deformation of the strips 3 and 4. Each of the strips 3, 4 has an additional lateral extension 15 which is soldered to one of the inleads 16 of the switch 11.

Where it is desired to further increase the difference between the speeds at which the mercury will flow in opposite directions several different modifications of this device are employed. Thus as shown in Fig. 4 the switch 11 is mounted in suitable fashion on a single strip 18 of spring metal which is electrically connected to the shaft 1 in any convenient manner, as by the stud 7. A boss 19 is provided in this strip which opposes outward movement of the free end of the strip, but which is adapted to snap to a reverse position when sufficient force is exerted thereon, after the manner disclosed in my Patent 1,961,722, this boss being so formed, however, that it will snap back of its own accord to its initial position whenever this force is released in a well known manner. One of the inleads of the switch 11 is connected to the spring 18, while the other is connected in any suitable manner with the upright 8, as by the flexible lead 20. A fiber or other insulating strip 21 which is hingedly mounted on the end of the spring strip 18 passes through a suitable slot in the upright 8, a pin 14 serving to limit the outward movement of the switch assembly, as in Figs. 1 to 3. The switch 11 is here shown inverted, so that the circuit therethrough closes when the critical speed of operation is reached and opens as the switch approaches a rest position, in order to illustrate the fact that either circuit opening or closing with increased speed is attainable at will in any of these embodiments of my invention.

In the operation of this switch the upward and outward flow of the mercury 17 with increased angular velocity occurs virtually simultaneously with the reversal of the boss 11, and may be the partial cause of this reversal, where the device is suitably designed. Once this boss has snapped to this reverse position it is obvious that the speed of rotation must be very greatly reduced before it will return to its initial position, with an attendant flow of the mercury 17 back to the bottom end of the switch 11.

Similar results are also attained with the structure of Figs. 1 to 3 by the expedient of slightly twisting the strips 3 and 4 to give the effects of a boss, as disclosed in my patent previously referred to, this being equivalent in effect to the single inlead 18, as there described. The resulting structure appears virtually the same as shown in Figs. 1 to 3, unless this twist is greatly exaggerated, and hence it is believed unnecessary to especially illustrate this embodiment.

Another means of increasing the snap action of the switch with increased speed of rotation is illustrated in Fig. 5. This embodiment also illustrates the fact that the switch support itself need not be resilient. Thus in this figure the switch 11 is mounted on a rigid member 22 which is hinged to the base 2 in order to permit movement of the free end thereof away from the axis of rotation, the tension spring 23 mounted between this member and the upright 8 supplying the spring effect of the spring strips 3, 4 and 18 of the previous figures which is required to move the switch toward the vertical position when at rest, and offering the desired opposition to the centrifugal forces during rotation. A suitable toggle arrangement 24 is arranged between the end of the member 22 and a transverse extension 25 of the upright 8 which tends to hold the switch assembly in either of two positions of rest determined by the stop pins 26 and 27 mounted on another transverse extension 28 of the upright 8. The electrical connections of the switch 11 to an external circuit have not been shown, it being obvious that these connections may be made in any desired manner, as by slip rings or the like.

The operation of this switch is obviously similar to that of Fig. 4, it being noted that the abrupt movement of the mass of the toggle accentuates the changes in the centrifugal force which govern the operation of the device.

The successful operation of my novel device is not, however, dependent upon the use of springs, as illustrated in Figs. 6 and 7. In this arrangement the switch 11 is supported by suitable clips on a tilting member 29 which is suitably carried by trunnions on the upright member 30 with the mass so distributed that at rest the member 29 is held by gravity against the stop 31, as shown in Fig. 1. This stop is so adjusted that the switch 11 has an upward and outward slope with respect to the axis of rotation. The connections of this device to an external circuit, while not shown, may obviously be made in any desired manner, as by connection through slip rings or the like to insulated trunnions, or in various other ways which will occur to those skilled in the art.

At rest this switch assumes the position shown in Fig. 6. As the shaft 1 is rotated, however, centrifugal forces exerted on the twitch 11 tending to rotate it in opposite directions on its trunnions increase, and dependent upon the initial angle, the relative disposition of mass with respect to the trunnions and the distance from the axis of rotation, these forces may increase unequally, and in some cases a speed is reached at which the switch will tilt away from the stop 31, and against the stop 32, as shown in Fig. 7, as a result of these unbalanced forces overcoming the effect of gravity. This tilting of the switch is accompanied by an immediate flow of the mercury. This radically alters the distribution of the switch mass, due both to the shift of the switch and of the mercury therein, which causes the switch to stay in this new position until the speed of rotation has very greatly decreased, in some cases even practically to standstill, where the switch reaches a near horizontal position, before return flow of the mercury due to gravity causes the switch to tilt back to its initial position. The same result is attained in a slightly different manner in other cases, where the conditions enumerated hereinbefore are slightly varied. With this mode of operation the switch remains at the angle determined by the stop 31 until the centrifugal force exerted on the mercury 17 is sufficient to cause this mercury to climb the slope of the switch. In this case the switch tilts either as soon as the mercury starts to move or at least as soon as it passes the pivot, due to the changes produced both in the centrifugal forces and the gravitational forces by this abrupt shift in mass. The operation thereafter is the same as that described hereinbefore. With this novel arrangement it is obvious that radical changes may be produced at will in the rotational speed at which the mercury flows in either direction, each independently of the other, by the simple adjustment of the stops 31 and 32. Hence this device is ideal for use in many applications where these features are desired.

While I have thus described my invention by reference to certain preferred embodiments thereof, it is to be understood that various changes, omissions and substitutions, within the scope of the appended claims, may be made therein without departing from the spirit of the invention.

I claim as my invention:

1. A centrifugal switch comprising a member rotatable about a substantially vertical axis, a switch supporting means mounted thereon, and a fluid flow switch of the tubular type mounted on said supporting means, at least a portion of said supporting means being movable with respect to said axis to permit the slope of said switch to change in response to centrifugal forces exerted thereon during rotation of said base.

2. A centrifugal switch comprising a member rotatable about a substantially vertical axis, a switch supporting means mounted thereon, and a fluid flow switch mounted on said supporting means, said supporting means providing a yielding support to said switch which tends to restrain movement thereof along an arc away from said axis in opposition to the centrifugal forces exerted on said switch during rotation of said base, whereby the orientation of said switch with respect to the open and closed circuit positions thereof changes with speed of rotation.

3. A centrifugal switch comprising a member rotatable about a substantially vertical axis, a pair of resilient leads extending upwardly from said member, a fluid flow switch of the tubular type supported on said leads in a position slightly displaced from the axis of rotation of said member, whereby the angle of tilt of said switch varies with the angular velocity of said member and with the position of the fluid within said switch.

4. A centrifugal switch comprising a member rotatable about a substantially vertical axis, a switch supporting means mounted on said member and extending upwardly therefrom, and a fluid flow switch mounted on said supporting means with the line of fluid flow therein between the open and closed circuit positions thereof extending along a line which is at a substantial angle above the horizontal when said member is at rest, said switch and support being mounted with the center of mass thereof eccentric to the axis of rotation of said member, said supporting means having a resilience which permits substantial outward movement of the upper end thereof when a force normal to said axis of rotation is exerted thereon by the centrifugal action of the eccentric mass, whereby the slope of the line of fluid flow in said switch decreases with increases in the speed of rotation, and then further decreases due to the shift of mass when the fluid within said switch flows outwardly within said switch under the influence of the centrifugal force exerted thereon when said member is rotated above a predetermined critical speed.

5. A centrifugal switch comprising a member rotatable about a substantially vertical axis, a switch supporting means mounted thereon, a fluid flow switch of the tubular type mounted on said supporting means, said supporting means providing a yielding support to said switch which tends to restrain movement thereof away from said axis in opposition to the centrifugal forces exerted on said switch during rotation of said member, and means cooperating with said yielding support to provide a snap action thereof in either direction from a predetermined position to change the slope of said switch.

6. A centrifugal switch comprising a member rotatable about a substantially vertical axis, a fluid flow switch of the tubular type pivotally supported on said member eccentric to said axis, the mass of said switch being so distributed with respect to the pivotal support that gravity causes said switch to rotate toward a vertical position, means to prevent said switch reaching a vertical position, and means to prevent said switch reaching a horizontal position under the influence of the centrifugal forces exerted thereon during rotation of said member.

7. A centrifugal switch comprising a member rotatable about a substantially vertical axis, a fluid flow switch of the tubular type pivotally supported on said member eccentric to said axis, the mass of said switch being so distributed with respect to the pivotal support that gravity causes said switch to rotate toward a vertical position, adjustable means to prevent said switch reaching a vertical position, and adjustable means to prevent said switch reaching a horizontal position under the influence of the centrifugal forces exerted thereon during rotation of said member, said adjustable means being adjustable independently of each other to provide circuit opening and closing at any desired speeds which are independent of each other.

WARREN R. WALKER.